R. M. CRAIG.
TROLLEY POLE.
APPLICATION FILED MAY 28, 1912.

1,048,661.

Patented Dec. 31, 1912.

WITNESSES
Wm L Bell
Elise Kaufmann

INVENTOR,
Robert M. Craig,
BY
ATTORNEY

UNITED STATES PATENT OFFICE.

ROBERT M. CRAIG, OF PATERSON, NEW JERSEY, ASSIGNOR OF ONE-HALF TO SAMUEL MULHOLLAND, OF PATERSON, NEW JERSEY.

TROLLEY-POLE.

1,048,661.   Specification of Letters Patent.   Patented Dec. 31, 1912.

Application filed May 28, 1912. Serial No. 700,240.

*To all whom it may concern:*

Be it known that I, ROBERT M. CRAIG, a citizen of the United States, residing at Paterson, in the county of Passaic and State of New Jersey, have invented certain new and useful Improvements in Trolley-Poles, of which the following is a specification.

This invention consists in certain improvements in trolley poles, and it has for its object to provide a trolley pole whose wheel shall be so mounted that it will run substantially without friction and will adjust itself to curvatures or bends in the trolley wire.

Figure 1:
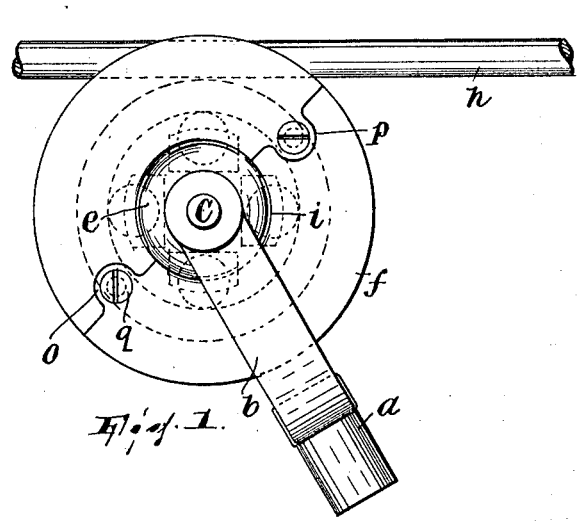
Figure 2:
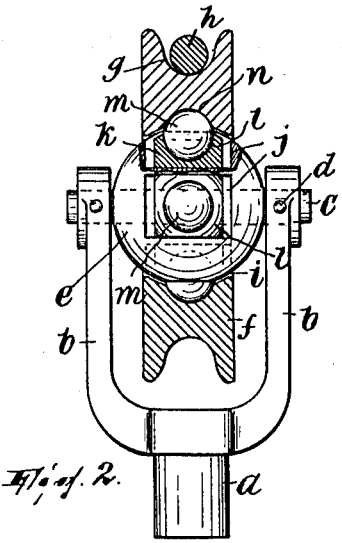
Figure 4:
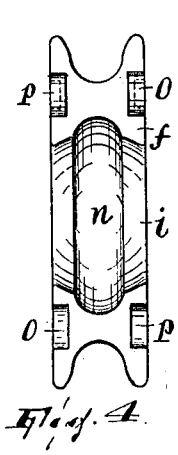
Figure 3:
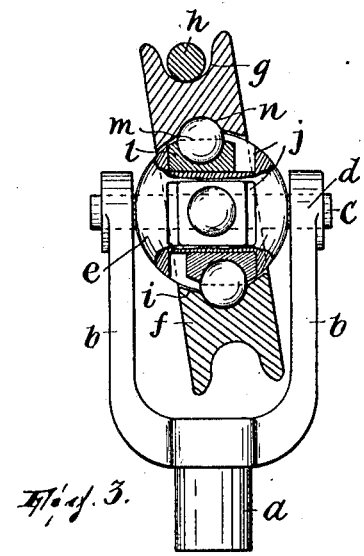

In the accompanying drawing, Figure 1 is a side elevation of the head of a trolley pole constructed in accordance with this invention; Fig. 2 is a front elevation, showing the wheel and a part of its bearing-forming means in section; Fig. 3 is a view of substantially the same character as Fig. 2, the wheel being shown canted, substantially as it would be in passing a lateral curvature in the trolley wire; and, Fig. 4 is an inside face view of one of the two parts of which the wheel is formed.

The head $a$ of the trolley pole is forked or bifurcated in the usual way; its fork-members $b$ $b$ are penetrated by the horizontal arbor $c$ which may be held in the fork-members by the pins $d$ or otherwise. On this arbor is journaled the spherical member $e$, the same being penetrated diametrically by the arbor and having support against any appreciable lateral movement by the fork-members $b$.

$f$ is the trolley wheel having the usual circumferential exterior groove $g$ to receive the trolley wire $h$. The wheel $f$ has a central recess $i$ which is formed spherical and closely fits around the spherical surface of the member $e$. At uniformly spaced points the member $e$ is formed with a plurality of sockets $j$ arranged circumferentially of said member $e$ in such manner that the central line of each socket is coincident with that central plane of member $e$ which is perpendicular to its axis of rotation. In these sockets are arranged the blocks $k$, one block to each socket, each block being held by its socket against movement circumferentially of member $e$ but being allowed some slight sidewise movement. Each block $k$ has an exterior spherical recess $l$ in which is seated and freely revoluble a ball $m$. The wheel $f$ has an internal circumferential groove $n$ forming a race in which the balls may run.

In order that the wheel may be assembled with the member $e$ I form it in two sections which are counter-parts of each other, as shown in Fig. 1, each section having ears $o$ overlapping the other section and received by recesses $p$ therein, $q$ being screws extending through the ears of one section and into the other to hold the sections together.

In view of the construction described it will be apparent that the trolley wheel runs substantially without friction. That, furthermore, it will adjust itself to bends or curvatures in the trolley wire, particularly those of a lateral nature, the blocks $h$ moving sidewise more or less as required and the wheel simply canting or tilting sidewise instead of bodily shifting.

Having thus fully described my invention, what I claim as new and desire to secure by Letters Patent is:—

1. In combination, a trolley pole head, a trolley wheel, an axial supporting member for the wheel arranged in the head and laterally sliding members arranged in said supporting member and surrounded by the wheel, said wheel and the sliding members being interlocked together against relatively sidewise movement, substantially as described.

2. In combination, a trolley pole head, a trolley wheel, an axial supporting member for the wheel arranged in the head, blocks having laterally sliding movement in said supporting member, said blocks having outwardly open recesses and said wheel having an interior circumferential groove, and balls interposed between said wheel and the blocks and each engaged in said groove and one of the recesses, substantially as described.

In testimony whereof I affix my signature in presence of two witnesses.

ROBERT M. CRAIG.

Witnesses:
JOHN W. STEWARD,
SAMUEL MULHOLLAND.

Copies of this patent may be obtained for five cents each, by addressing the "Commissioner of Patents, Washington, D. C."